Dec. 21, 1926.

S. I. FEKETE 1,611,176

FAN BELT PULLEY FOR AUTOMOBILES

Filed July 28, 1923

INVENTOR=
Stephen I. Fekete
by Macleod, Calvi, Copeland & Dike
Attys.

Patented Dec. 21, 1926.

1,611,176

UNITED STATES PATENT OFFICE.

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN.

FAN-BELT PULLEY FOR AUTOMOBILES.

Application filed July 28, 1923. Serial No. 654,325.

This invention relates to a new and useful improvement in pulleys. It is especially intended for use as the lower fan pulley for an automobile engine, but the invention is not intended to be limited to such use. The object of the invention is to provide a pulley of simple and cheap form of construction and of light weight yet sufficiently strong to perform the work required of it. One feature of the invention consists in forming the pulley out of two shells each stamped out of a blank of sheet material. Another feature of the invention relates to the means for making driving connection between the pulley and the hub of a driving gear.

The invention will be fully understood by reference to the following description when taken in connection with the accompanying drawings, and the novel features thereof are clearly pointed out and distinctly defined in the claims at the close of this specification.

In the drawings, Fig. 1 is a side elevation, partly in section showing a portion of a crank shaft with its chain driving gear and a pulley embodying the invention.

Figure 1:
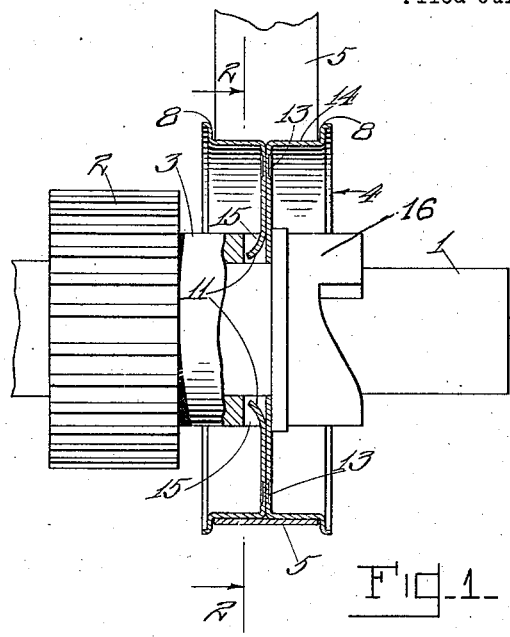

Referring now to the drawings, 1 is a crank shaft on which is mounted the ordinary chain driving gear 2 and pulley 4 embodying the invention. The gear 2 is fast to the shaft and is provided with a hub 3 which is adapted to engage the pulley 4 and cause it to rotate with the shaft. There is shown at 5 a portion of a fan belt which is driven by the pulley.

The pulley is composed of two companion shells placed in inverted relation to each other back to back and secured together, each of the shells having a flanged annular rim, the two flanges forming the groove of the pulley, the bases of the shells having a hole through which the shaft passes, and the shell having means for locking it to the hub of the gear so as to rotate therewith.

Figure 4:
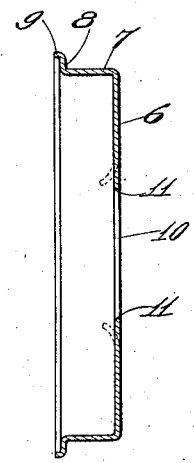
Fig. 4 is a section on line 4—4 of Fig. 3.

The two shells are first made exactly alike. Each piece is stamped or drawn out of a single sheet of steel or other suitable material in such manner as to form a cup-shaped seamless shell having a base 6, a cylindrical body portion 7 and an annular flange 8 terminating in a lip 9. There is cut out of the blank, preferably at the same stamping a hole 10 of the size of the shaft on which the pulley is to be mounted. There are also stamped out in each shell, two tongues 11, 11, diametrically opposite each other by cutting slots 12, 12 leading from the periphery of the hole 10 in the blank. The tongues 11, 11 on one of the two shells are then turned inwardly as shown in dotted lines in Fig. 4 for the purpose to be hereinafter described, it not being necessary to turn up the tongues of the other shell as the tongues of only one of said shells perform any function. The reason for making both shells with these tongues is to render them interchangeable, and thus avoid the necessity of making two sets of shells one with tongues and one without tongues. The shell is open at the outer side, that is at what might be termed the rim side of the cup which is surrounded by the lip 9.

Figure 2:
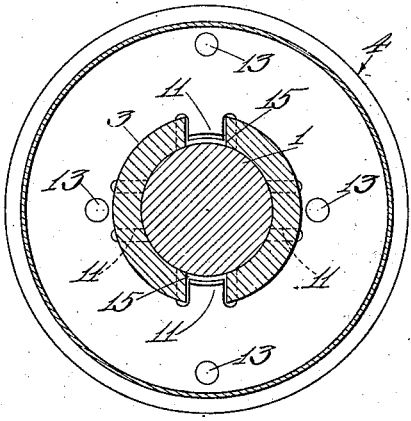
Fig. 2 is a section on line 2—2 of Fig. 1.
Figure 3:
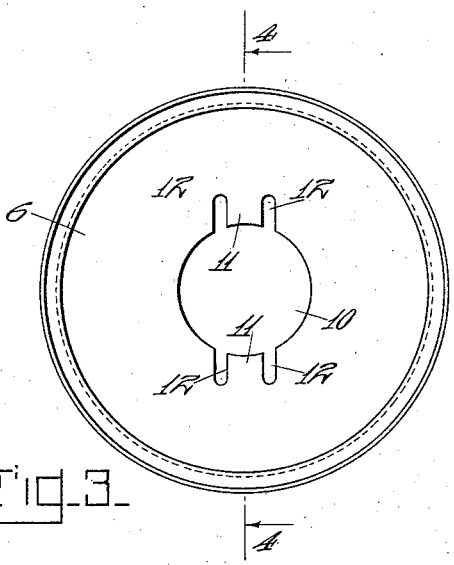
Fig. 3 is an end view of one of the two shells after it is stamped out ready to be united with a companion shell to form the pulley.

In assembling the two shells, they are placed base to base with the tongues 11 of one of the shells disposed at an angle of 90° from the tongues of the other shell as plainly shown in Fig. 2. In this position the two shells are secured together, preferably by spot welding, as indicated at 13. Any other suitable means of uniting them may be employed. The pulley is now complete, the groove 14 for the belt being formed between the flanges 8, 8, of the two companion shells.

The hub 3 of the gear is formed with two slots 15, 15, diametrically opposite to each other of a width equal to the width of the tongues 11 and with which the tongues of the shell which is nearer the hub of the gear will engage. The tongues 11, 11, when thus engaged with the recesses 15, 15 form driving connections between the hub of the gear and the pulley.

Suitable means are provided for maintaining the pulley against axial outward movement on the shaft to hold the said tongues 11 in engagement with the recesses 15. The means shown consists of a removable collar 16.

The pulley thus formed is much lighter than the heavy cast iron pulleys usually employed yet is sufficiently strong for the work required of it, and it is very cheap and simple to make, since no lathe or other machine tool work is required in its manufacture. While the pulley has been shown and described herein as being driven by a gear wheel, it is obvious that any other suitable driving means may be employed. Furthermore while it is especially intended to be driven by engagement with a driving wheel and to itself drive the belt, it is obvious that the action may be reversed and the belt may be connected with a driving means, thereby driving the pulley so that the pulley in turn drives the wheel 2, its shaft 1, and its connections.

What I claim is—

1. A pulley composed of two cup-shaped shells of sheet material placed base to base and secured together, the bases of said shells being formed with a shaft hole, the base of one of said shells having a plurality of slots extending from the periphery of said hole toward the outer periphery of the shell thereby forming tongues, said tongues being bent out of the plane of said base and being adapted to form driving connection with a slotted hub.

2. A pulley composed of two cup-shaped shells of sheet material placed base to base and secured together, the bases of said shells being formed with a shaft hole, the base of one of said shells having a plurality of slots extending from the periphery of said hole toward the outer periphery of the shell thereby forming tongues, said tongues being bent out of the plane of said base and being adapted to form driving connection with a slotted hub, in combination with a wheel hub having a plurality of slots extending in from the outer end thereof which are engaged by the said bent tongues on the shell to form driving connection between the pulley and the hub.

3. A pulley composed of two cup-shaped shells of sheet material placed base to base and secured together, the bases of said shells being formed with a shaft hole, the base of one of said shells having a plurality of slots extending from the periphery of said hole toward the outer periphery of the shell thereby forming tongues, said tongues being bent out of the plane of said base and being adapted to form driving connection with a slotted hub, in combination with a wheel hub having a plurality of slots extending in from the outer end thereof which are engaged by the said bent tongues on the shell to form driving connection between the pulley and the hub, the said hub and pulley being releasable from driving engagement with each other by an axial movement of one with relation to the other without mutilation of either member.

4. A wheel having a hub formed with a plurality of slots in the periphery of the hub extending in from the outer end thereof, in combination with a pulley composed of two cup-shaped shells of sheet material placed base to base and secured together, the said bases being formed with a shaft hole, the base of one of said shells having a plurality of slots extending from the periphery of said hole toward the outer periphery of the shell thereby forming tongues, said tongues being bent out of the plane of said base and engaging with said slots in the hub to form driving connection between the hub and the pulley.

5. A wheel having a hub formed with a plurality of slots in the periphery of the hub extending in from the outer end thereof, in combination with a pulley composed of two cup-shaped shells of sheet material placed base to base and secured together, the said bases being formed with a shaft hole, the base of one of said shells having a plurality of slots extending from the periphery of said hole toward the outer periphery of the shell thereby forming tongues, said tongues being bent out of the plane of said base and engaging with said slots in the hub to form driving connection between the hub and the pulley, and a shaft on which said wheel and hub are mounted in such manner as to rotate therewith.

6. The combination of a shaft, a hub fast thereon and having a slotted end, a sheet metal pulley having a hole to receive said shaft and offset tongues immediately adjacent said hole engaging the slots in said hub to form a positive driving connection therewith, and means to hold said pulley in operative position with said tongues engaged in said slots.

In testimony whereof I affix my signature.

STEPHEN I. FEKETE.